United States Patent
Schindler

(10) Patent No.: US 7,154,614 B2
(45) Date of Patent: Dec. 26, 2006

(54) DEVICE AND METHOD FOR WRITING IMAGE INFORMATION ONTO RECORDING MATERIAL

(75) Inventor: Hans-Georg Schindler, Holzkirchen (DE)

(73) Assignee: AGFA-Gevaert Aktiengesellschaft, Leverkusen (DE)

( * ) Notice: Subject to any disclaimer, the term of this patent is extended or adjusted under 35 U.S.C. 154(b) by 1246 days.

(21) Appl. No.: 09/910,177

(22) Filed: Jul. 20, 2001

(65) Prior Publication Data

US 2002/0015168 A1    Feb. 7, 2002

(30) Foreign Application Priority Data

Aug. 3, 2000    (DE) ................. 100 37 781

(51) Int. Cl.
*G06F 15/00*    (2006.01)

(52) U.S. Cl. ........................ 358/1.12; 399/84
(58) Field of Classification Search ............. 358/1.12, 358/1.9, 461, 1.1; 399/84, 193, 349; 347/15, 347/105, 10; 400/283, 103
See application file for complete search history.

(56) References Cited

U.S. PATENT DOCUMENTS

2002/0057457 A1 * 5/2002 Nozaki et al. ............. 358/1.18

FOREIGN PATENT DOCUMENTS

| DE | 1233263 | | 12/1967 |
|----|---------|---|---------|
| DE | 99101154.5 | * | 8/1994 |
| DE | 19622170 | | 12/1996 |
| EP | 0924558 | | 6/1999 |
| JP | 61278838 | | 12/1986 |
| JP | 00147680 | | 5/2000 |
| WO | WO9748011 | | 12/1997 |

* cited by examiner

*Primary Examiner*—King Y. Poon
*Assistant Examiner*—Saeid Ebrahimi-Dehkordy
(74) *Attorney, Agent, or Firm*—Milde & Hoffberg, LLP

(57) ABSTRACT

In a device (1) for writing image information onto recording material (2), several separate images (B1 to B13) are assigned to the image information. Marks (M1 to M14) that are assigned to the several images (B1 to B13) are applied to the recording material (2) with a marking means (3). An output unit (4) is used for outputting the image information onto the recording material (2). Using a first transport means (5), the recording material (2) is transported in the area of the marking means (3). A second transport means (6) serves to transport the recording material (2) in the area of the output unit (4). The first transport means (5) and the second transport means (6) are designed such that the transport direction (T4, R4) of the recording material in the output unit (4) can be set independently of the transport of the recording material (2) in the marking means (3).

14 Claims, 4 Drawing Sheets

DEVICE AND METHOD FOR WRITING IMAGE INFORMATION ONTO RECORDING MATERIAL

BACKGROUND OF THE INVENTION

The present invention relates to a device and a method for writing image information onto recording material. More particularly, this invention relates to a photographic printer.

A device and method of the type to which the invention relates are known from the published European Patent Application No. EP 0 924 558 A1. This publication describes a photographic printer that is capable of exposing the image information of several images onto photosensitive material. Initially, the photosensitive material in strip-shape receives a mark for each image to be exposed using a marking means. Each mark can then be recognized by a sensor located in an output unit of the known printer. This output unit is used to provide the previously determined image information of the individual images to the photosensitive recording material. The mark applied by the marking means onto the photosensitive material serves the purpose of specifying the start of the output process for outputting the image information of an image by the output unit. If such a mark is recognized by the sensor, the output process is started according to the recognition of the mark. Image data with the image information of the individual images that are to be output onto the photosensitive material is stored in a memory and provided for each output unit as required. Transport of the photosensitive material in the known printer is stopped if the image data with image information of the next image that is to be output onto the photosensitive material is not yet available in the printer, after an image has previously been written to the material by the output unit. Thereafter, the photosensitive material is moved back both in the marking means and in the output unit until the mark of the next image that is to be written to the photosensitive material is positioned behind the sensor for recognizing the mark. Thus, after this mark has arrived behind the position of the sensor, the return transport of the photosensitive material is stopped. The printer now waits for the arrival of the missing image data. After this data has arrived, a new transport of the photosensitive material from the marking means in the direction of the output unit occurs. The output of the image information of the next image to be output is initiated through the recognition by the sensor of the previous corresponding mark, which has been moved back. Transport of the entire photosensitive material located in the printer, through the known printer, is consistently in the same direction, that is, either from the marking means in the direction of the output unit, or conversely, from the output unit in the direction of the marking means. Due to the return transport of the photosensitive material, it is, therefore, possible to keep the consumption of the unused material after the interruption for providing the image data to a minimum. However, the design of the transport mechanism of the printer disclosed in the aforesaid publication, EP 0 924 558 A1, is very elaborate.

SUMMARY OF THE INVENTION

It is, therefore, the principal objective of the present invention to provide a device and a method for writing image information onto recording material in a simple manner such that the consumption of unused recording material can be kept to a minimum. The device for writing image information comprises:

(a) marking means for marking the recording material with marks (M1–M14) that are assigned to the several images (B1–B13);
(b) an output unit for outputting image information onto the recording material;
(c) a first transport means for transporting the recording material in the marking means; and
(d) a second transport means for transporting the recording material in the output unit.

The objective referred to above, as well as other objectives which will become apparent from the discussion that follows, are achieved, in accordance with the present invention, by designing both the first transport means and the second transport means such that the transport direction of the recording material in the output unit can be set independently of the transport of the recording material in the marking device.

Due to the fact that, according to the invention, the transport means in the area of the output unit and the transport means in the area of the marking means are designed such that the direction of transport of the recording material can be set independently of the transport in the marking means, it is possible to create a simple technical and constructive design, especially of the transport means in the area of the marking means. Advantageously, this transport means in the area of the marking means does not have to ensure that a perfect and highly precise return transport of the recording material in the marking means is enabled at the time of the reverse transport of the recording material in the output unit. According to the invention, the recording material can be transported back in the output unit without, at the same time, transporting the recording material also back in the marking means. The transport means in the area of the marking means, therefore, does not require the inclusion of a reversible drive with regard to the transport direction of the recording material. Here, the term "transport means" can include all components provided for transporting the recording material, in particular transport rollers, drives as well as a control device for controlling the drives and transport rollers. In addition, a guide device that is used for guiding the recording material during the transport through the marking means need only be designed for highly precise guiding of the recording material in the direction of transport from the marking means to the output unit. Guiding of the recording material in the opposite direction, that is, from the output unit in the direction of the marking means is not necessary. Thus, this guide system can advantageously also be designed in a simple manner with regard to construction and specification limits to be followed.

According to one advantageous embodiment of the invention, the image writing device includes receiving means that allow for a reception of image data that contains the image information of the images that are to be written onto the recording material. Such receiving means may be an interface to a network, for example.

In an additional advantageous embodiment of the invention, transport of the recording material in the marking means is stopped by the first transport means if it is detected that image data with image information of an image to be written onto the recording material is not received. This is, because due to the non-reception of the image data, it may be possible that the image format of the image to be written onto the recording material cannot be determined, in particular in the direction of the transport of the recording material. As a result, the marking means cannot place a respective mark for signifying the beginning and/or the end of this image onto the recording material. The non-reception of image data can be detected, for example, in that an otherwise continuous stream of image data that is received at the receiving means is interrupted. A certain defined duration during which the receiving means is not able to receive image data may be specified as well. If image data is not received during this period, then the transport of the recording material in the marking means is stopped.

In an additional advantageous embodiment of the invention, transport of the recording material in the marking means is continued if image data with the complete image information of the image, whose non-reception has previously been determined, is received. In this manner, it can advantageously be ensured that the format of the image can be determined by using image data containing the complete image information, such that the marking means is able to provide a mark for this image on the recording material.

In an additional particularly advantageous embodiment of the invention, transport of the recording material in the marking means is stopped if separate information regarding the length format of an image that is to be written to the recording material cannot be received. The information of the length format of this image serves the marking means to place the mark for the beginning and/or the end of this image on the recording material.

Advantageously, transport of the recording material in the marking means continues when the previously not received information regarding the length information of the image can be received.

Advantageously, the transport of the recording material is halted in the output unit after the non-reception of image data of an image to be written to the recording material only after the image data of the image information of a certain image has been completely output when the non-reception of the image data in the output unit is detected, such that the image information of this respective image is completely written to the recording material.

In an additional particularly advantageous embodiment of the invention, the transport direction of the recording material in the output unit is reversed after the transport in the output unit is halted. Thus, the second transport means moves the recording material in the transport direction that is opposite to that for normal outputting of the image information. This ensures that the continued transport of the recording material can occur in the regular transport direction for outputting the image information as soon as the information regarding the length format of one of the images and/or the complete image information of this image has been received. Waiting for the reception of the complete image information of the image—that is, regardless whether the length format is received separately or is determined from the completely received image data with the image information of the image—is advantageous because it ensures that the complete image information is present, and thus can be transferred to the output unit for outputting. This can avoid a potential renewed halting of the transport of the recording material due to incompletely available image information of the image at the output unit. Due to the reversal of the transport direction that follows directly after the stop in the area of the output unit, the waiting time for receiving the format information or the complete image information can be used in that the recording material in the output unit is already moved back to that place where the continuation of the transport of the recording material after the arrival of the format information or the complete image information can occur without a problem. Advantageously, the recording material is moved back so far that when the transport of the recording material in the output unit continues, it is ensured that normal transport conditions are reached when the end of the previous last image information that is written to the recording material is reached at the output position. Normal transport conditions are specified known conditions during the transport of the recording material, where in particular an essentially constant transport speed is set. In particular, brake and acceleration phases during the transport of the recording material do not constitute normal transport conditions. Thus, immediately after the acceleration phase, after the renewed start-up of the recording material, the output of the image information can take place by the output unit.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
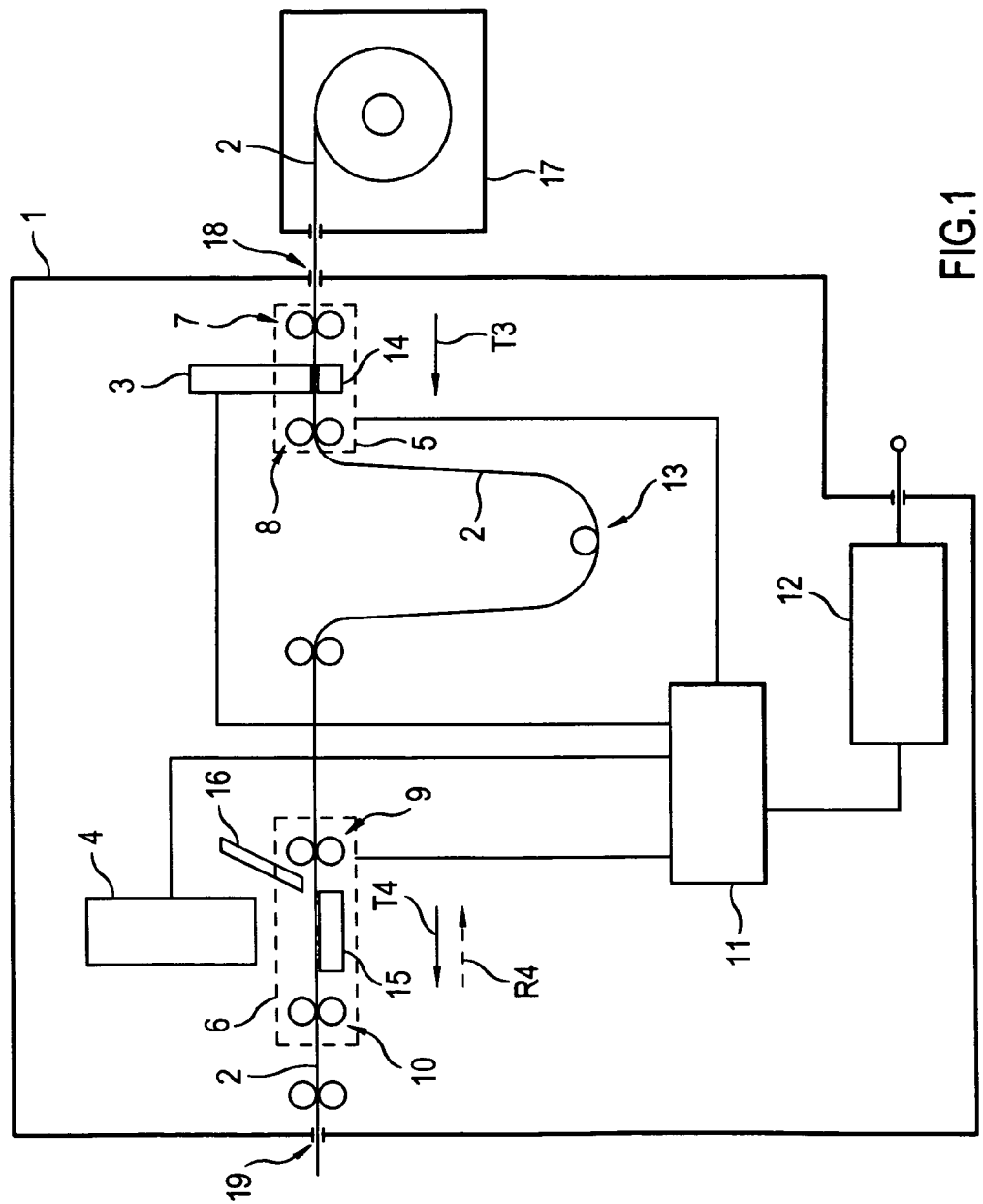
FIG. 1 is a schematic representation of a preferred embodiment of a device according to the invention, in an implementation as a digital photographic printer.

The preferred embodiments of the present invention will now be described with reference to FIGS. 1–3 of the drawings. Identical elements in the various figures are designated with the same reference numerals.

FIG. 1 shows a preferred embodiment of a device according to the invention for writing image information onto recording material. In the present implementation, this device is a digital photographic printer 1 that can be used to expose photographic paper 2, which serves as the recording material.

The expression "writing image information onto recording material" is used herein to describe placing any type of image information onto any type of recording material. Aside from exposing image information onto photographic paper, as is the case with the printer 1 in this preferred embodiment, an inkjet printer may be used that outputs ink onto paper, which serves as the recording material, for example. The term "recording material" shall, therefore, include all such materials that are suitable for receiving and presenting the image information—adapted to the respective method of writing.

Here, the photographic paper 2 is a strip-shaped recording material coiled on rolls. To expose the photographic paper 2, the printer 1 contains a digital exposure unit 4 that has digital image data fed to it. These digital image data contain the image information that is to be exposed onto the photographic paper 2. In this present preferred embodiment, the exposure unit 4 includes lasers that generate at least three laser beams in the red, green and blue wavelength ranges of the spectrum. These laser beams are modulated according to the image information to be exposed using one or more modulators. Here, the exposure unit 4 constitutes an output unit for outputting image information. Other exposure means such as LEDs or so-called digital micro-mirror devices, DMDs, can be employed for exposing the photographic paper 2 in place of lasers. In addition to exposure units such as the lasers, the term "output unit" for outputting image information on recording material also applies to other writing devices for writing onto recording material: for example, ink jet printers.

The photographic printer 1 includes on one side an inlet 18 for feeding in the photographic paper 2. The opposite side of the printer 1 includes an outlet 19 for feeding out the exposed photographic paper 2 from the printer 1 using the exposure unit 4. The strip-shaped photographic paper 2, which is coiled in a roll-shape, is contained in a cassette 17 that is docked to the printer 1. The cassette 17 is docked to the printer 1 such that the strip-shaped photographic paper 2 is fed into the printer 1 via the inlet 18. The printer 1 contains several guide elements for guiding the photographic paper 2 and several transport roller pairs for transporting the photographic paper 2 from its inlet 18 to its outlet 19. A punching device 3 for punching small holes in different designs into the photographic paper 2 is located inside the printer 1 next to the inlet 18. The punching device 3 serves as the marking means for marking the photographic paper 2. Thus, the holes introduced by the punching device 3 into the photographic paper 2, preferably in the edge areas, constitute such marks. The printer includes a first means of transportation 5 near the punching device 3 for transporting the photographic paper 2 in a transporting direction T3, that is, from the punching device 3 in the direction of the exposure unit 4. This first transporting means 5 includes a first transport roller pair 7 that is located directly adjacent to the inlet 18 to the right of the punching device 3, and a second transport roller pair 8 located on the left side of the punching device 3. Each of the transport roller pairs includes two pivoted rollers arranged one on top of the other that guide the strip-shaped photographic paper 2 between them. The transport roller pairs are driven by drives not shown here.

For precise guiding of the photographic paper 2 in the punching device 3, the printer 1 includes in the area of the punching device 3 a first guide device 14 that ensures precise guiding of the photographic paper 2 during the transport in the direction of the exposure unit 4. Assisted by the design and placement of this first guide device 14 and the movement of the two transport roller pairs 7 and 8, it is possible to punch very precise holes into the photographic paper 2 using the punching device 3. The punching device 3 can be designed such that it punches holes into the photographic paper 2 while the photographic paper 2 is transported in the transport direction T3 using the first transport means 5. In this case, the punching device can be designed as a rotating punch with a rotating speed that is adapted to the transport speed of the photographic paper 2 in the area of the punching device 3. However, it is also possible to stop the photographic paper 2 inside the punching device 3 for the marking procedure. The punching device 3 can then punch the holes into the photographic paper 2 during the pause of the paper transport. Of course, another kind of marking means can be provided inside the printer 1 in place of the punching device 3. For example, an inkjet printer can be imagined as a marking means that places respective marks onto the recording material. For the functionality of the present invention, it is not necessary to insert holes into the photographic paper 2 using the marking means. Such marks can be created in some other form as well.

Located inside the printer 1, underneath the exposure unit 4, is a second guide device 15 that serves as a paper stage. This paper stage 15 is used to guide the photographic paper 2 in the area of the exposure unit 4. The paper stage 15 is designed such that it is possible to very precisely guide and transport the photographic paper 2 in the area of the exposure unit 4 both in a direction T4—that is, from the exposure unit 4 in the direction of the outlet 19—and in the opposite direction R4—that is, from the exposure unit 4 in the direction of the punching device 3. Both, the first guide system 14 in the area of the punching device 3 and the second guide system 15 in the area of the exposure unit 4 can exhibit active or also passive elements for guiding the photographic paper 2. For example, steering rollers for active steering of the photographic paper 2 in the guide systems 14 and/or 15 can be included.

The printer 1 includes a second transport means 6 for transporting the photographic paper 2 in the area of the exposure unit 4. The second transport means 6 includes a first transport roller pair 9 that is located to the right of the paper stage underneath the exposure unit 4. In addition, the second transport means 6 exhibits a second transport roller pair 10, located to the left of the paper stage 15 underneath the exposure unit 4. The second transport means 6 can transport the photographic paper 2 in the area of the exposure unit 4 in both the direction T4 as well as the opposite direction R4. For this purpose, the drive for turning the two transport roller pairs 9 and 10 is reversible. The transport direction of the photographic paper 2 and direction of rotation of the rollers of the two transport roller pairs 9 and 10 are reversible. A sensor 16 is located in direct proximity of the paper stage 15 and that location of the paper stage 15 where the laser emitted by the exposure unit 4 is to strike the photographic paper 2, such that the marks (holes) inserted into the photographic paper 2 by the punching device 3 can be detected. The sensor 16 can be a light box, for example.

A paper slack is provided between the punching device 3 and the exposure unit 4. This paper slack 13 serves as a small buffer zone for interim storage of photographic paper 2. In this manner, the transport of the photographic paper 2 in the area of the punching device 3 is decoupled from the transport of the photographic paper 2 in the area of the exposure unit 4. It is furthermore possible to temporarily continue to supply the exposure unit 4 for exposing the image information onto the photographic paper 2 with photographic paper 2, even though the transport of the photographic paper 2 has been stopped in the area of the punching device 3 and there is temporarily no transport of the photographic paper from the punching device 3 into the paper slack.

The printer 1 contains a control device 11 that is used to control the functions that can be carried out with the printer 1 and, specifically, the controllable components of the printer 1. In particular, the control device 11 is connected to the first and second transport means 5 and 6, the punching device 3 and the exposure unit 4. Via the control device 11, the two transport means 5 and 6 receive the respective control signal for carrying out the transport of the photographic paper 2 in the area of the punching device 3 as well as in the area of the exposure unit 4. Using the control device 11, it is in particular possible to carry out the transport in the area of the punching device 3 in the direction T3 but also to interrupt the transport. Furthermore, the control means 11 can be used to control the second transport means 6 such that the transport of the photographic paper 2 is carried out in the direction T4 and also in the opposite direction R4. Using the control device 11, it is furthermore possible to control the second transport means 6 to stop the transport of the photographic paper 2. The two transport means 5 and 6 can thus be controlled independently of one another by the control device 11.

The connection between the control device 11 and the punching device 3 serves the purpose of supplying the punching device 3 with suitable control signals to carry out the punching of holes into the photographic paper 2. The control device 11 is capable of determining the length format of the images to be exposed onto the photographic paper 2, viewed in the direction of transport. For example, this can be carried out by providing a specification of these respective lengths. However, it can just as well be possible to determine these respective length formats of the images from data sets with the respective digital image data of the images.

The connection between the control device 11 and the exposure unit 4 serves, in particular, the purpose of controlling the exposure unit 4 using digital image data that contain the image information that is to be exposed onto the photographic paper 2. To receive this image information, the printer 1 includes a receiving means 12 that can receive image data. This image data is transferred by the receiving means 12 to the control device 11. For this purpose, the control device 11 is connected with the receiving means 12. The receiving means 12 can include an interface to a network, for example. However, it is just as well possible that the image data with the image information is stored on a diskette, a CD-ROM, etc., and that the receiving means 12 includes a respective reading device for reading such a medium. The network that is used to supply the receiving means with image data can be a so-called Local Area Network, LAN, within a photo-finishing laboratory. However, it is also possible that the receiving means can alternatively or additionally receive image data from a public data network such as the Internet, for example. In addition to the image data with the image information, accompanying data to the respective image data can be received via the receiving means 12 as well. Such accompanying data may contain, for example, the desired format for the generation of the image with the printer 1. Advantageously, the control device 11 prepares the image data that is received by the receiving means 12. For example, through such a preparation, the exposure with the exposure unit 4 can be adapted to the particular attributes of the photographic paper 2 in use.

A preferred embodiment for carrying out the method according to the invention using the photographic printer 1 according to FIG. 1 will now be described, based on FIGS. 2A and 2B.

Figure 2A:
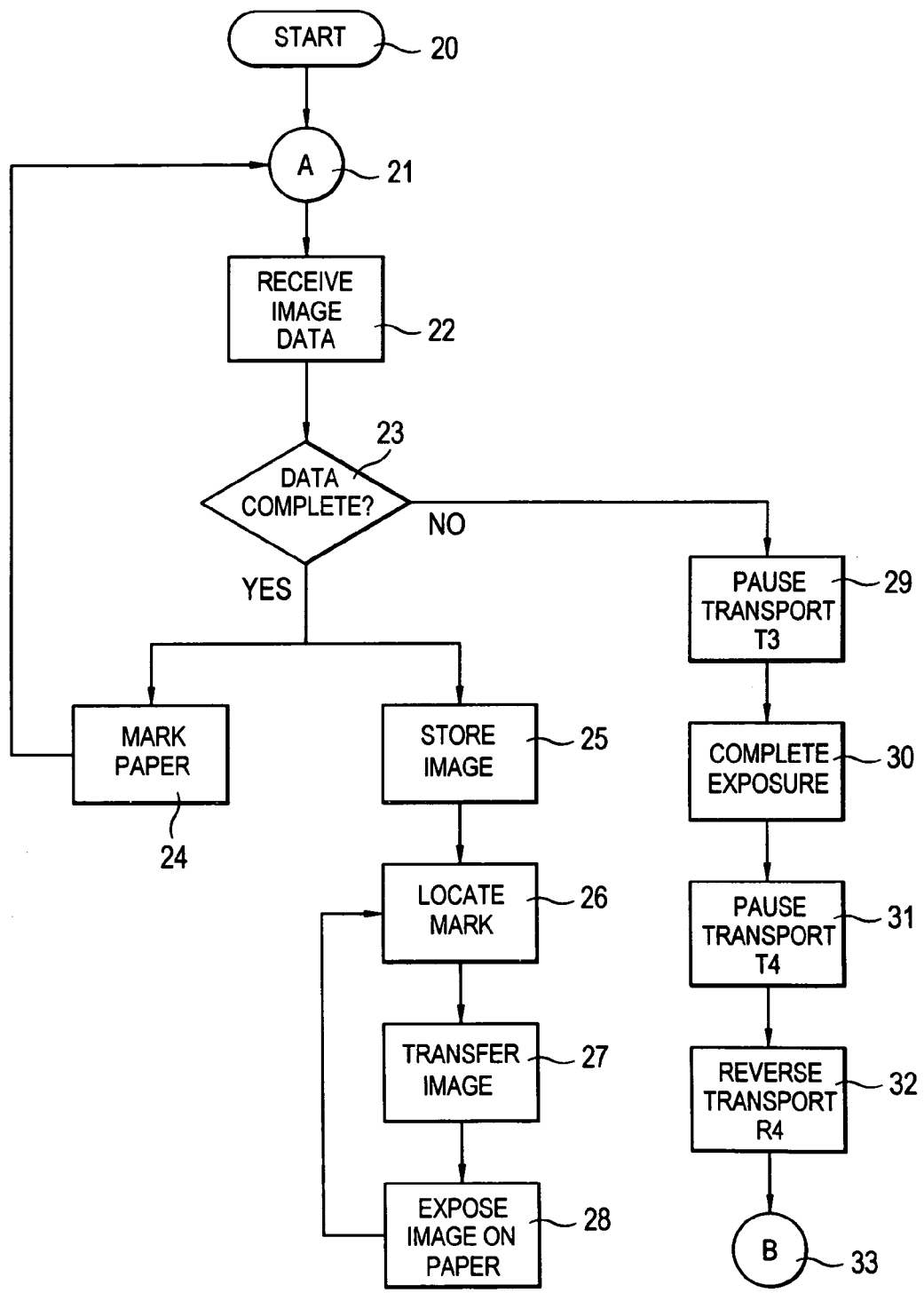
FIGS. 2A and 2B are flow charts of a preferred embodiment for carrying out the method according to the invention using the photographic printer of FIG. 1.
Figure 2B:
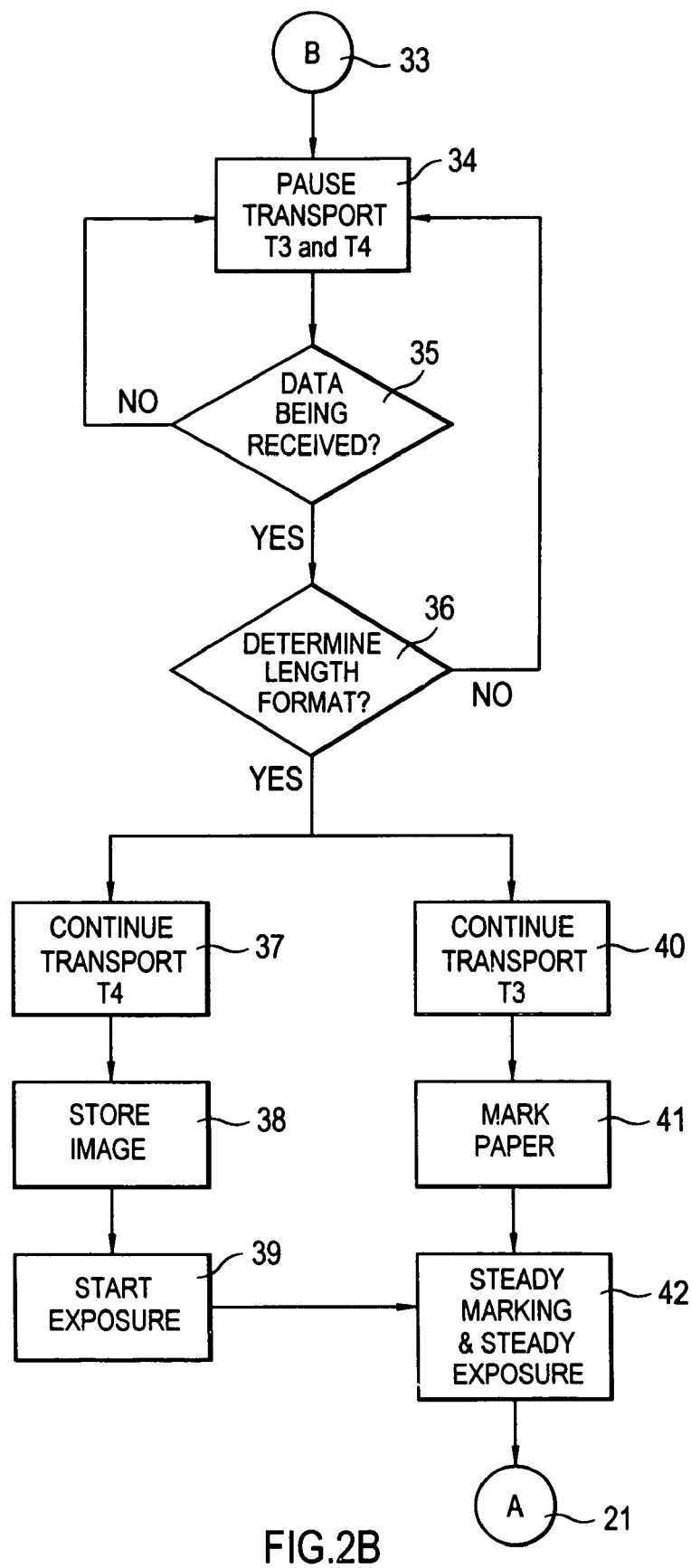

FIGS. 2A and 2B are exemplary flow charts of the method according to the invention that can be used to carry out an exposure of the photographic paper 2 using the exposure unit 4 of the printer 1 even after an interruption of the transport of the photographic paper 2 through the printer 1. The transition of the first part of the flow chart presented in FIG. 2A to the second part of the flow chart presented in FIG. 2B is designated with a branch-off point B in the process step 33. The return branch-off point at the end of the flow chart (FIG. 2B) to the beginning of the flow chart (FIG. 2A) is designated with a branch-off point A in a process step 21.

Initially, FIG. 2A shows a first process step 20 that designates the beginning of the flow-chart. The branch-off point A follows this beginning 20 in an additional process step 21. After the branch-off point A, the reception of the image data at the receiving means 12 occurs in a process step 22. This image data contains the image information of several images that are to be exposed onto the photographic paper 2 using the printer 1. Here the image data that is received in process step 22 is fed into the printer 1 via a network. The image information that is contained in the image data has been obtained through a scanning procedure where film negatives are read by a scanner that will not be further described here. The image data determined by the scanner is prepared and transmitted via the network to the receiving means 12. A next step 23 checks whether a complete data set with image data of an image that is to be exposed onto photographic paper 2 has been received by the receiving means 12. Based on this complete data set, using the control device 11, it is possible to determine the length format of the respective image that is to be exposed, viewed in the direction of transport. In place or in addition to monitoring the reception of the complete data set of image data in the process step 23, it is possible to monitor the reception of the length format of the respective image that is to be exposed onto the photographic paper 2. If the length format of the respective field to be exposed could be determined in process step 23 based on the received complete data set of image data and/or the reception of separate information, then the method according to the invention branches off to a next step 24, where a punching device 3 is controlled by a control device 11 such that it inserts a mark in the photographic paper 2 corresponding to the length format determined in step 23. This can ensure that the distance between the mark applied on the photographic paper 2 by the punching device 3 and the previous mark—in the transport direction T3 of the photographic paper 2—is dimensioned such that the image that will subsequently be exposed using the exposure unit 4 can be exposed according to the desired and specified length format. After marking the photographic paper 2 in step 24, the method subject to the invention at this point branches to the branch-off point A in step 21. Thus, the punching device 3 waits for new information regarding the length format of the next image in order to apply a corresponding mark.

Aside from the branching off in process step 24, the method branches off after determining the length format in step 23 to a step 25, where the respective received image data is stored temporarily. For this purpose, the printer 1 includes a memory not shown here. During this phase of the method, the photographic paper 2 is continuously transported from the inlet 18 in the direction of the outlet 19 using, among others, the two transport means 5 and 6. After the interim storage of the image data in the memory, the sensor 16 in a step 26 monitors the mark previously applied by the punching device 3 onto the photographic paper 2. If the sensor 16 recognizes this mark, the image data stored previously in a memory will be called up in a subsequent process step 27 and transferred to the exposure unit 4 based on the control of the control device 11. The image information contained in the image data that has been transferred is then exposed by the exposure unit 4 onto the photographic paper 2 in the subsequent step 28. A precisely defined advance of the photographic paper 2 using the second transport means 6 occurs between the recognition of the mark by the sensor 16 and the exposure of the image information that corresponds to this mark using the exposure unit 4. In this manner, the exposure of the image on the photographic paper 2 can start directly at this respective mark. After full exposure of the respective image, the method branches from step 28 to step 26. The process waits for the detection of the next mark in order to expose the image information of the next image onto the photographic paper 2 as described above.

If a complete data set of image data that is assigned to an image that is to be exposed subsequently could not be determined during the check in process step 23, or a corresponding separate information could not be received such that it is not possible to determine the length format of this image, the method according to the invention branches off to a step 29. In this step 29, the continuation of the transport of the photographic paper 2 using the first transport means 5 in the area of the punching device 3 is interrupted. A step 30 that follows the process step 29 checks whether that image that is being exposed onto the photographic paper 2 using the exposure unit 4 at the time of the interruption of the transport in the area of the punching device is exposed completely. If this is the case, the method continues with processing step 31, where the exposure of image information onto the photographic paper 2 is interrupted as well. The transport of the photographic paper 2 in the area of the exposure unit 4 is stopped due to respective control of the second transport means 6 by the control device 11. Stopping the continuation of the transport of the photographic paper 2 in the area of the exposure unit 4 is subject to a certain braking operation. The effect of this braking operation is that the speed of the advance of the photographic paper 2 in the area of the exposure unit 4 is ambiguous. Thus, adjusting the exposure to the advance of the photographic paper in the direction T4 is difficult if not impossible. For this reason, the exposure using the exposure unit 4 is interrupted and then the braking operation to stop the photographic paper 2 is initiated. However, this results in a continuation of transport of the photographic paper 2 by the transport means 6 without simultaneous exposure of image information. This could lead to the consumption of unused photographic paper 2.

To avoid this unused consumption of the photographic paper 2, the photographic paper 2 is moved back in the area of the exposure unit 4 by the second transport means 6 after the interruption of the exposure and the end of the braking operation, in a subsequent step 32. This move back occurs in the reverse direction R4 that is opposite the transport direction T4. According to the invention, this reverse move of the photographic paper 2 does not occur in the area of the punching device 3. The first transport means 5 does not carry out any transport move during the reverse transport of the photographic paper 2 in the area of the exposure unit 4 using the second transport means 6. Advantageously, the transport of the photographic paper 2 in the area of the punching device 3 remains interrupted during the reverse transport of the photographic paper 2 in the area of the exposure unit 4.

Once the move back of the photographic paper 2 in the area of the exposure unit 4 is completed, the method branches off in a process step 33 via the branch-off point B to the second part of the flow chart that is presented using FIG. 2B. In the subsequent step 34, both the transport of the photographic paper 2 in the area of the punching device 3 and in the area of the exposure unit 4 are interrupted. A step 35 checks whether the receiving means 12 is again receiving image data after the interruption of the reception of image data. If this is not the case, the process returns again to process step 34. If a continuation of the reception has been determined in the process step 35, then the next step 36 investigates, whether the length format of the next image can be determined due to the continuation of the reception of image data or due to additional information in step 35. If this is not possible, the process again branches back to process step 34 such that the transport in the area of the punching device 3 and of the exposure unit 4 continues to be interrupted and continues to wait for the continuation of the reception of image data and/or additional information.

If the length format could be determined in process step 36, then the process branches off to a process step 40, where the continuation of the transport of the photographic paper 2 in the area of the punching device 3 is carried out. The speed of the continuation of the transport in the area of the punching device 3 can advantageously be temporarily set higher than under regular transport conditions. This is particularly important if, due to the interruption of the transport of the photographic paper 2 in the area of the punching device 3 (step 29), the transport of the photographic paper 2 continues in the area of the exposure unit 4 according to step 30 in order to completely expose the image that is being exposed at that time. In this caes, the length of photographic paper 2 in the paper slack 13 will accordingly be reduced. Thus, the advance speed of the photographic paper 2 in the area of the punching device 3 can be increased temporarily to reverse this shortening of the paper slack 13. To achieve this advantage, a time delay of the continuation of the transport in the area of the exposure unit 4 verses the continuation of the transport of the photographic paper 2 in the area of the punching unit 3 can be imagined as well. This can ensure that the length of the photographic paper 2 in the area of the paper slack 13 assumes a certain pre-specified value. However, it can also be imagined that the transport speed in the area of the punching device 3 is temporarily set slightly lower compared to that in the area of the exposure unit 4, or that the continuation of the photographic paper 2 in the area of the punching device 3 is carried out with a time delay with respect to that in the area of the exposure unit 4. This is particularly advantageous when more photographic paper 2 has entered the area of the paper slack 13 due to the reverse move of the photographic paper 2 in the area of the exposure unit 4 than is desired based on the pre-specified value.

In a step 41, a mark is applied using the punching device 3 at the previously determined location of the photographic paper 2, similar to step 24. However, the marking of the photographic paper 2, as it is carried out in the process step 41, can already be performed during the continuation of the transport of the photographic paper 2 in step 40. After marking the photographic paper 2 in step 41, the printer 1 is moved to a steady marking operation in step 42.

In addition to the method according to the invention branching off to the process step 40 after determining the length format of the image in step 36, the process also branches off to a process step 37, where the photographic paper 2 continues its transport in the area of the exposure unit 4. The image data that continues to be received by the receiving means 12 is transferred to the interim memory in a step 38. Step 39 then starts the exposure of the image information onto the photographic paper 2 as soon as the required steady transport conditions for the transport of the photographic paper 2 are present, the next mark is recognized by the sensor 16 and the end of the previous image has been reached in the output position of the exposure unit 4. These required steady transport conditions are advantageously achieved exactly when the next mark is recognized by the sensor 16. Thus, step 32 must ensure that the photographic paper 2 is moved back a respective specified distance. After the start of the exposure with the exposure unit 4, a steady exposure operation is also present in the next process step 42. After both a steady exposure operation and a steady marking operation are present in process step 42, the method braches again off to the step 21, and thus to the branch-off point A at the beginning of the flow diagram (FIG. 2A).

In the following, various positions of the photographic paper 2 are described during its run from the punching device 3 to the exposure unit 4 based on FIGS. 3A to F. Thus, different sections are represented on the photographic paper 2 that are intended for the exposure of images with different formats, in particular different length formats. Position P3 designates the position of the punching device 3, position P13 the position of the paper slack 13 and position P4 the position of the exposure unit 4 in the printer 1. Drawn into the sections of the photographic paper 2 that are presented in FIGS. 3A to F are various areas B1 to B13 that present the designated areas for the images on the photographic paper 2. These areas B1 to B13 have several different length formats L1 to L13. Marks M1 to M13 that are assigned to the respective image areas B1 to B13 are applied to the photographic paper 2 in front of these image areas. These marks M1 to M13 are applied to the photographic paper 2 by the punching device 3 at the position P3.

Figure 3A:
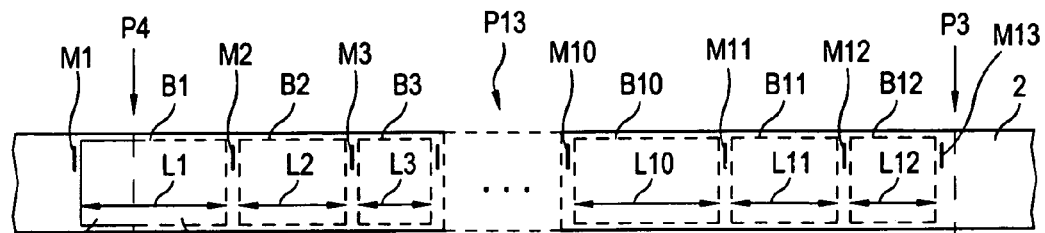
FIGS. 3A–3F are exemplary schematic representations of recording material running through a marking means and an output unit with image sections provided on the recording material.

FIG. 3A shows a first situation during the exposure of image information and the marking of marks onto the photographic paper 2. Here, the first image area B1 is split into a first partial area B1L and a second partial area of the image B1U. The first partial image area B1L is drawn to the left of the position P4 with a solid line. Image information that is part of the image that is to be exposed into the image area B1 is already exposed onto the photographic paper in this first partial image area B1L. The second partial image area B1U stretches to the right of position P4 of the exposure unit 4. It depicts an—at this time—unexposed portion of the image area B1 that is intended for continued exposure of image information of the image that is to be exposed into the first image area B1. The areas of the image areas B1 and B2 (FIG. 3F) with the solid borders in FIGS. 3A to 3F depict such areas that have already been exposed with the image information. Dash-lined areas of the image areas B1 to B13 depict such areas that have not yet been exposed by the exposure unit 4 with the image information, that are, however, intended for exposure with the image information of the respective images.

In the first transport situation according to FIG. 3A, a transport of the photographic paper 2 occurs in both, the transport direction T3 in the area of the position P3, and thus in the area of the punching device 3, as well as in the transport direction T4 in the area of the position P4, and thus in the area of the exposure unit 4. Under this normal operation, the receiving means 12 continuously receives new image data and length formats. Continuous marking and exposure is, therefore, possible.

Figure 3B:
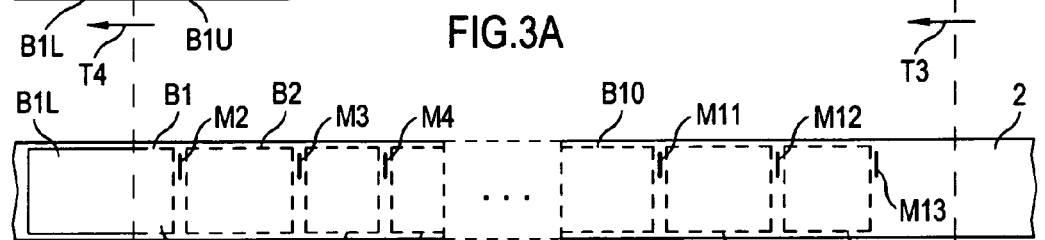

In the second presentation of a situation of the photographic paper 2 according to FIG. 3B, the reception of image data and/or length information by the receiving means 12 has been interrupted. Thus, the transport of the photographic paper 2 in the area of the position P3 is stopped. The transport of the photographic paper 2 in the area of the position P4 continues, because not all image information for the complete exposure of the image intended for the area B1 has been exposed using the exposure unit 4. This can be recognized in FIG. 3B in that a section B1U, although smaller than in FIG. 3A, is still present. The transport of the photographic paper 2 in the area P4 is stopped only once all image information for the image has been exposed in area B1.

It is also possible to let the transport of the photographic paper 2 in the area P3 and the function of the punching device 3 continue until no further information about the length format of the images to be exposed is present in the printer 1. This can be advantageous if, at the time of the interruption of the reception, additional information about length formats is stored in the printer 1 that has not yet been converted into marks by the punching device 3.

Figure 3C:
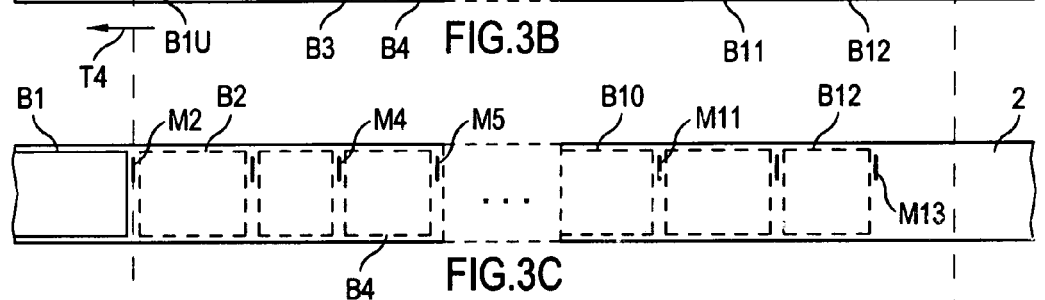

This is the case in the third situation according to FIG. 3C. Here, the complete image information is written to the first image area B1. The continuation of the transport of the photographic paper 2 in the area of the position P4 is interrupted. For simplicity sake, this stopping of the photographic paper 2 in the area of P4 can be made dependent upon the recognition of the subsequent mark M2 by the sensor 16. According to the third transport situation presented in FIG. 3C, the photographic paper 2 is at a standstill both at the position P3 as well as at the position P4.

Figure 3D:
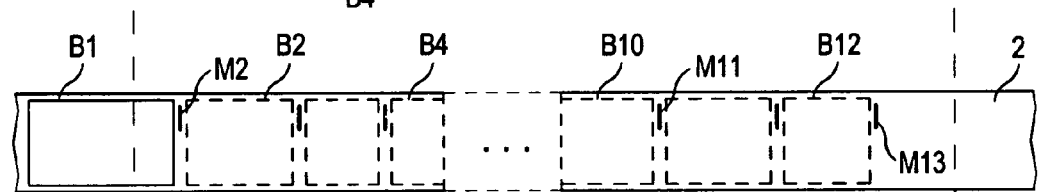

In the fourth transport situation of the photographic paper 2, as presented in FIG. 3D, still no image data and/or length information are received by the receiving means 12. The photographic paper 2 is still not transported in the area of the punching device 3, and thus at the position P3. The photographic paper 2 continues to be at a standstill in this area. However, in the area of position P4, the photographic paper 2 is moved back in the reverse direction R4. The distance that the photographic paper 2 is moved back in the area of the position P4 is adjusted to the renewed establishment of steady transport conditions at the continued exposure. This shall ensure that the speed for the renewed transport of the photographic paper 2 in the direction T4 has steadily reached the value that is adapted to the exposure procedure using the exposure unit 4. In particular, this includes the acceleration condition at the renewed start-up of the photographic paper transport. In this fourth transport situation according to FIG. 3D, the printer 1 again waits for the reception of image data for a next image that will follow the image area B12.

Figure 3E:
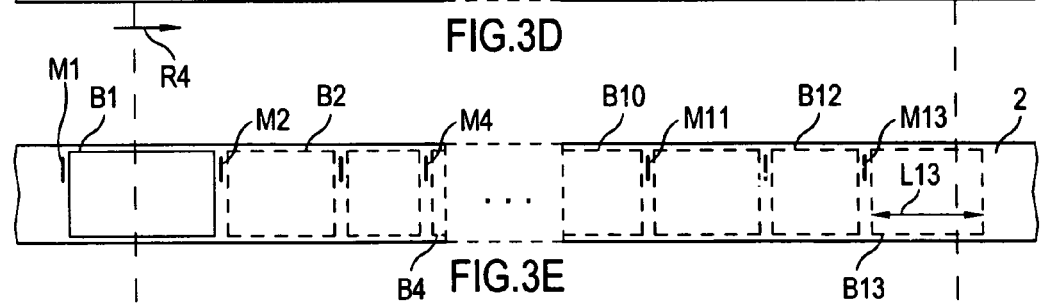

In the subsequent fifth transport situation according to FIG. 3E, the receiving means 12 receives additional image data. This image data contains image information for the image that shall be exposed into the area B13. Because of the reception of this image data, it is possible to determine the length L13 of this image area B13. This image area B13 follows immediately after the mark M13.

Figure 3F:
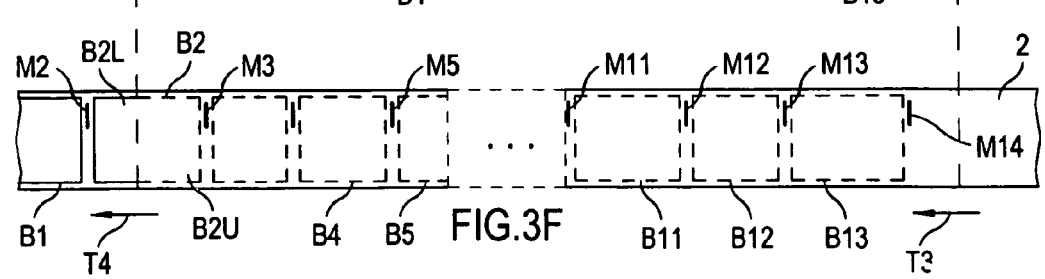

In the sixth transport situation of the photographic paper 2, as presented in FIG. 3F, the photographic paper 2 is transported both in the transport direction T3 in the area of the position P3 of the punching device 3 as well in the transport direction T4 in the area of the position P4 of the exposure unit 4. Due to the previously determined length L13 of the thirteenth image area B13, the punching device 3 places a mark M14 at the determined location on the photographic paper 2, where said mark follows immediately after the end of the image area B13. This mark M14 is assigned to an image area that follows the image area B13 and is not further presented here. FIG. 3F also indicates that the photographic paper 2 continues to be transported in the area of the exposure unit 4. A portion B2L of the second image area B2 has already been exposed with image information. Another portion B2U of the image area B2 has not yet been exposed with image information. Exposure of the image area B2 has been started by the sensor 16 dependent upon the recognition of the mark M2. At the time of the exposure of this second image area B2, the photographic paper 2 has reached the regular transport speed in the area P4.

There has thus been shown and described a novel device and method for writing image information onto recording material which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A device for writing image information that is assigned to several images (B1–B13) onto recording material, said device comprising in combination:
   (a) marking means for marking the recording material with marks (M1–M14) that are assigned to the several images (B1–B13);
   (b) an output unit for outputting image information onto the recording material;
   (c) a first transport means for transporting the recording material in the marking means in a first transport direction (T3); and
   (d) a second transport means for transporting the recording material in the output unit in a second transport directions (T4, R4);
   wherein said first transport means and the second transport means are operative such that the second transport direction (T4, R4) of the recording material in the output unit is set independently of the first transport direction (T3) of the recording material in the marking means, and
   wherein said second transport directions (T4, R4) are in two opposing directions.

2. Device as set forth in claim 1, further comprising a control device connected to the first and the second transport means, for providing control signals to said first and second transport means.

3. Device as set forth in claim 2, wherein said control device separately controls the first and the second transport means.

4. Device as set forth in claim 1, further comprising a receiving means for receiving image data with the image information of the several images (B1–B13).

5. Device as set forth in claim 2, wherein the control device is connected with the output unit for providing control signals thereto.

6. Device as set forth in claim 4, wherein the first transport means is operative such that stopping of the transport of the recording material in the marking means is carried out in dependence upon the non-reception of the image data of one of the several images (B1–B13).

7. Device as set forth in claim 6, wherein the first transport means is operative such that, after stopping the transport, a continuation of the transport of the recording material in the marking means is initiated in dependence upon the reception of a complete image information of that image (B13) whose image data has not been received before.

8. Device as set forth in claim 4, wherein the first transport means is designed such that a stopping of the transport of the recording material in the marking means is carried out in dependence upon a non-reception of format information concerning the length (L13), viewed in the transport direction (T4, T3) of the recording material, of an image (B13) to be written to the recording material.

9. Device as set forth in claim 8, wherein the first transport means is designed such that, after stopping the transport, a continuation of the transport of the recording material in the marking means is initiated in dependence upon the reception of the format information concerning the length (L13) of the image (B13) to be written to the recording material.

10. Device as set forth in claim 4, wherein the second transport means is designed such that a stopping of the transport of the recording material in the output unit is carried out in dependence upon the non-reception of image data of one of the several images and in dependence upon the output of the complete image information of that image (B1), whose image information is put out at the non-reception of the image data of the image using the output unit.

11. Device as set forth in claim 2, wherein the second transport means is designed such that the transport direction (T4, R4) of the recording material in the output unit is reversible in response to a control signal from the control device.

12. Device as set forth in claim 11, wherein the control device controls the second transport means such that the recording material is transported so far back in the direction of the marking means that pre-specified transport conditions are present at the continuation of the transportation of the recording material for the renewed output of image information.

13. Device as set forth in claim 12, wherein the specified transport conditions are present when a steady, essentially constant transport speed of the recording material in the area of the output unit is given.

14. Method for writing image information that is assigned to several images (B1–B13) onto recording material, said method comprising the steps of:
   (a) marking the recording material with marks (M1–M14) that are assigned to the several images (B1–B13);
   (b) outputting image information onto the recording material; and
   (c) transporting the recording material for marking the same and for outputting the image information, wherein the first transport direction (T3) of the recording material for marking the same is set independently of the second transport direction (T4, R4) of the recording material for outputting the image information, said second transport directions (T4, R4) being in two opposing directions.

* * * * *